US010070455B2

(12) United States Patent
Lee et al.

(10) Patent No.: US 10,070,455 B2
(45) Date of Patent: Sep. 4, 2018

(54) METHOD AND APPARATUS FOR PRIORITIZING D2D TRANSMISSION AND D2D RECEPTION IN WIRELESS COMMUNICATION SYSTEM

(71) Applicant: LG ELECTRONICS INC., Seoul (KR)

(72) Inventors: Youngdae Lee, Seoul (KR); Sunghoon Jung, Seoul (KR)

(73) Assignee: LG ELECTRONICS INC., Seoul (JP)

( * ) Notice: Subject to any disclaimer, the term of this patent is extended or adjusted under 35 U.S.C. 154(b) by 0 days.

(21) Appl. No.: 15/128,404

(22) PCT Filed: Mar. 30, 2015

(86) PCT No.: PCT/KR2015/003118
§ 371 (c)(1),
(2) Date: Sep. 22, 2016

(87) PCT Pub. No.: WO2015/147615
PCT Pub. Date: Oct. 1, 2015

(65) Prior Publication Data
US 2017/0230993 A1    Aug. 10, 2017

Related U.S. Application Data

(60) Provisional application No. 61/971,546, filed on Mar. 28, 2014.

(51) Int. Cl.
*H04W 72/12* (2009.01)
*H04L 5/00* (2006.01)
(Continued)

(52) U.S. Cl.
CPC ....... *H04W 72/1242* (2013.01); *H04L 5/0053* (2013.01); *H04W 72/1215* (2013.01);
(Continued)

(58) Field of Classification Search
CPC ......... H04W 72/1242; H04W 72/1289; H04W 72/1215; H04W 72/048; H04W 72/10; H04L 5/0053
See application file for complete search history.

(56) References Cited

U.S. PATENT DOCUMENTS

2012/0106437 A1   5/2012   Seo et al.
2013/0064146 A1*  3/2013   Ahn ..................... H04W 76/023
                                                        370/280

(Continued)

OTHER PUBLICATIONS

Kyocera, "Design details of scheduling assignments", 3GPP TSG RAN WG1 Meeting #76bis, R1-141459, Mar. 21, 2014, 5 pages.
(Continued)

*Primary Examiner* — Feben M Haile
(74) *Attorney, Agent, or Firm* — Lee Hong Degerman Kang Waimey (57) ABSTRACT

A method and apparatus for prioritizing a device-to-device (D2D) transmission and a D2D reception in a wireless communication system is provided. A user equipment (UE), which cannot perform the D2D transmission and the D2D reception at the same subframe simultaneously, detects both the D2D transmission and the D2D reception, which are scheduled at the same subframe, and determines whether to perform either the D2D transmission or the D2D reception at the same subframe.

14 Claims, 10 Drawing Sheets

(51) Int. Cl.
*H04W 72/10* (2009.01)
*H04W 72/04* (2009.01)

(52) U.S. Cl.
CPC ...... *H04W 72/1289* (2013.01); *H04W 72/048* (2013.01); *H04W 72/10* (2013.01)

(56) References Cited

U.S. PATENT DOCUMENTS

| | | | | |
|---|---|---|---|---|
| 2013/0128858 | A1* | 5/2013 | Zou | H04W 76/023 |
| | | | | 370/329 |
| 2014/0243038 | A1* | 8/2014 | Schmidt | H04W 76/023 |
| | | | | 455/552.1 |
| 2016/0066356 | A1* | 3/2016 | Lindoff | H04W 52/383 |
| | | | | 370/329 |
| 2016/0174122 | A1* | 6/2016 | Sorrentino | H04B 1/3822 |
| | | | | 370/331 |
| 2016/0295624 | A1* | 10/2016 | Novlan | H04W 76/14 |
| 2017/0295559 | A1* | 10/2017 | Agiwal | H04W 72/14 |
| 2017/0332352 | A1* | 11/2017 | Sheng | H04W 72/02 |
| 2018/0014146 | A1* | 1/2018 | Gulati | H04W 4/70 |

OTHER PUBLICATIONS

Qualcomm Incorporated, "Coexistence of D2D discovery and WAN", 3GPP TSG-RAN WG1 Meeting #76bis, R1-141456, Mar. 22, 2014, 6 pages.

LG Electronics, "Discussion on D2D signal transmission and reception timing", 3GPP TSG RAN WG1 Meeting #76bis, R1-141359, Mar. 22, 2014, 6 pages.

Alcatel-Lucent Shanghai Bell et al., "D2D channel design for broadcast communication", 3GPP TSG RAN WG1 Meeting #bis, R1-141252, Mar. 22, 2014, 8 pages.

* cited by examiner

METHOD AND APPARATUS FOR PRIORITIZING D2D TRANSMISSION AND D2D RECEPTION IN WIRELESS COMMUNICATION SYSTEM

CROSS-REFERENCE TO RELATED APPLICATIONS

This application is the National Stage filing under 35 U.S.C. 371 of International Application No. PCT/KR2015/003118, filed on Mar. 30, 2015, which claims the benefit of U.S. Provisional Application No. 61/971,546 filed on Mar. 28, 2014, the contents of which are all hereby incorporated by reference herein in their entirety.

BACKGROUND OF THE INVENTION

Field of the Invention

The present invention relates to wireless communications, and more particularly, to a method and apparatus for prioritizing a device-to-device (D2D) transmission and a D2D reception in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Recently, there has been a surge of interest in supporting proximity-based services (ProSe). Proximity is determined ("a user equipment (UE) is in proximity of another UE") when given proximity criteria are fulfilled. This new interest is motivated by several factors driven largely by social networking applications, and the crushing data demands on cellular spectrum, much of which is localized traffic, and the under-utilization of uplink frequency bands. 3GPP is targeting the availability of ProSe in LTE rel-12 to enable LTE become a competitive broadband communication technology for public safety networks, used by first responders. Due to the legacy issues and budget constraints, current public safety networks are still mainly based on obsolete 2G technologies while commercial networks are rapidly migrating to LTE. This evolution gap and the desire for enhanced services have led to global attempts to upgrade existing public safety networks. Compared to commercial networks, public safety networks have much more stringent service requirements (e.g., reliability and security) and also require direct communication, especially when cellular coverage fails or is not available. This essential direct mode feature is currently missing in LTE.

As a part of ProSe, device-to-device (D2D) operation between UEs has been discussed. The D2D operation may include D2D transmission and D2D reception. When the UE cannot perform D2D transmission and D2D reception simultaneously, a method for prioritizing D2D transmission and D2D reception may be required.

SUMMARY OF THE INVENTION

The present invention provides a method and apparatus for prioritizing a device-to-device (D2D) transmission and a D2D reception in a wireless communication system. The present invention provides a method for prioritizing the D2D transmission and the D2D reception, which are scheduled at the same subframe, when a user equipment (UE) cannot perform the D2D transmission and the D2D reception simultaneously.

In an aspect, a method for prioritizing, by a user equipment (UE), a device-to-device (D2D) transmission and a D2D reception in a wireless communication system is provided. The method includes detecting, by the UE, both the D2D transmission and the D2D reception, which are scheduled at the same subframe, and determining, by the UE, whether to perform either the D2D transmission or the D2D reception at the same subframe. The UE cannot perform the D2D transmission and the D2D reception at the same subframe simultaneously.

In another aspect, a user equipment (UE) is provided. The UE includes a memory, a transceiver, and a processor coupled to the memory and the transceiver, and configured to detect both the D2D transmission and the D2D reception, which are scheduled at the same subframe, and determine whether to perform either the D2D transmission or the D2D reception at the same subframe. The UE cannot perform the D2D transmission and the D2D reception at the same subframe simultaneously.

Overlapping of D2D transmission and D2D reception can be avoided.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
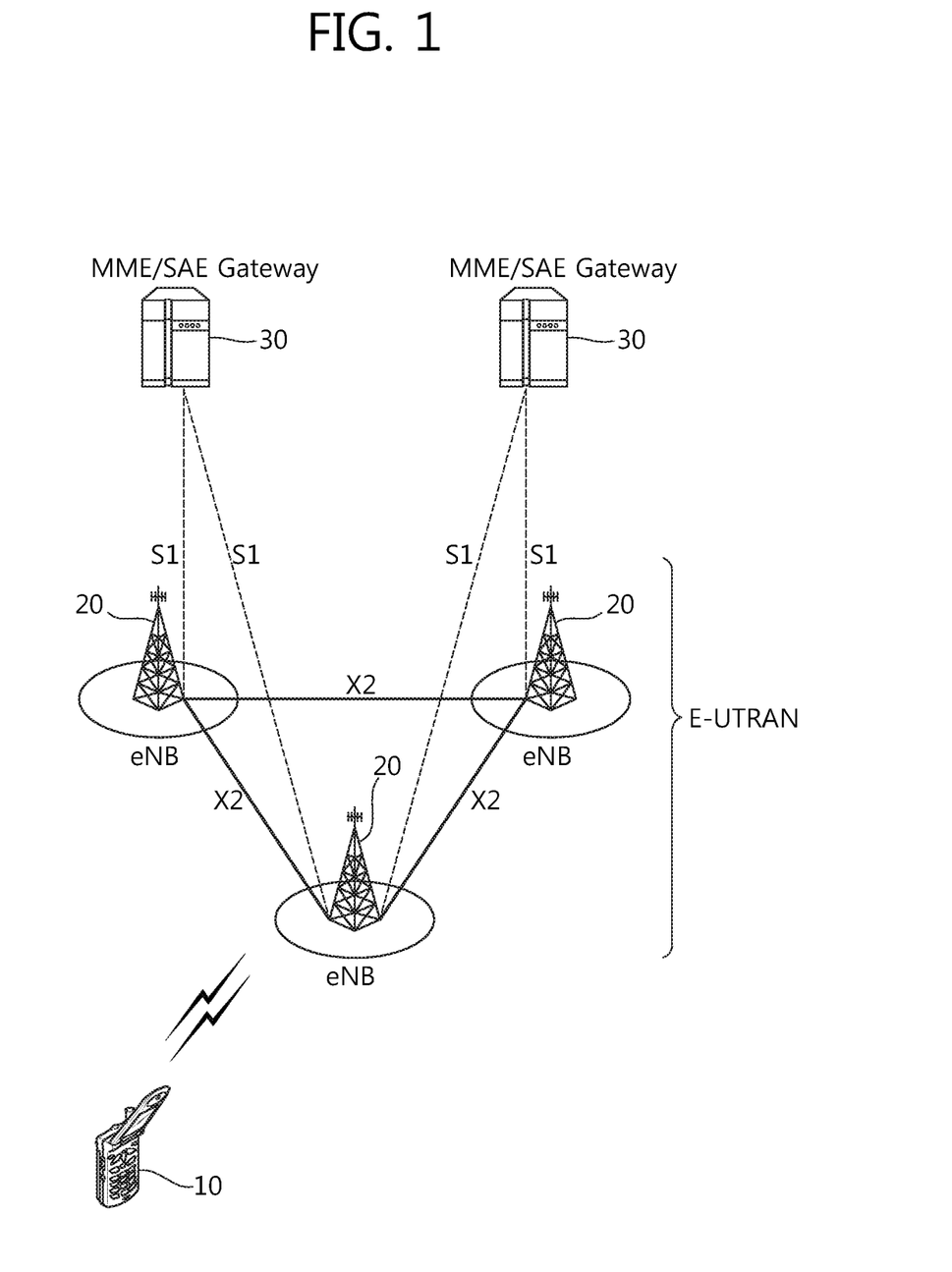
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
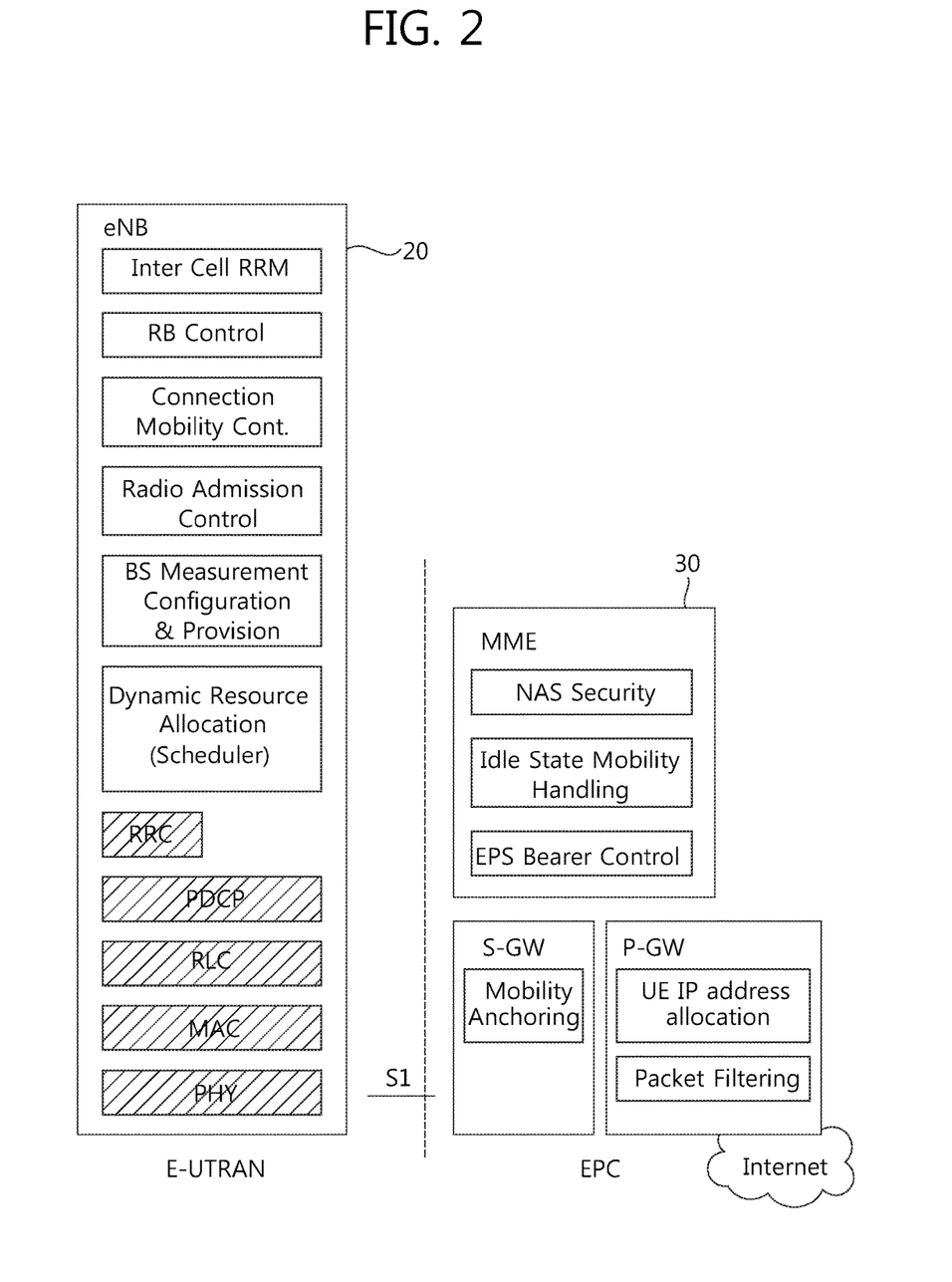
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
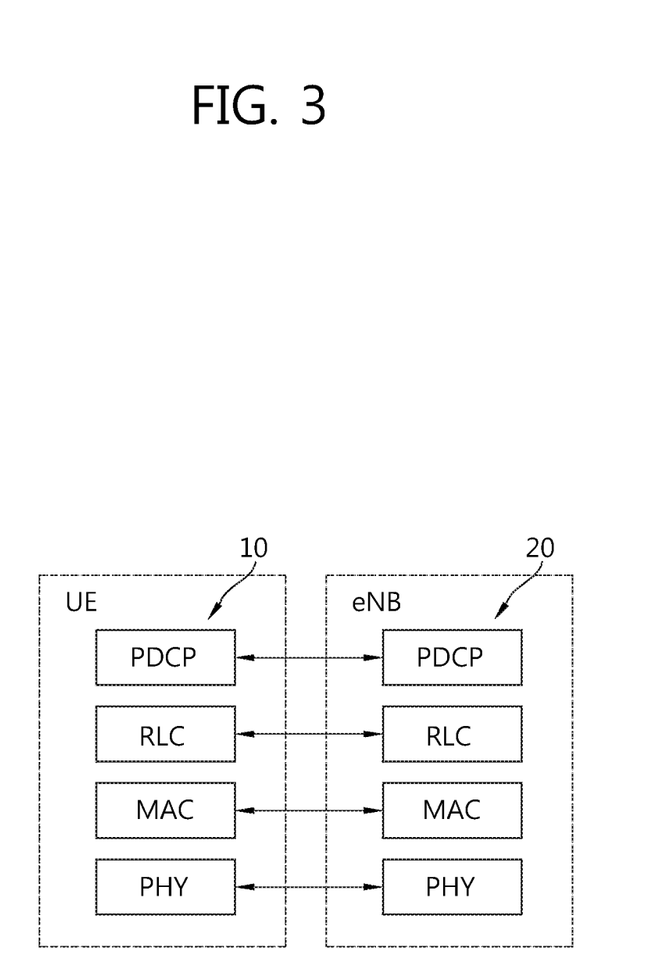
FIG. 3 shows a block diagram of a user plane protocol stack of an LTE system.
Figure 4:
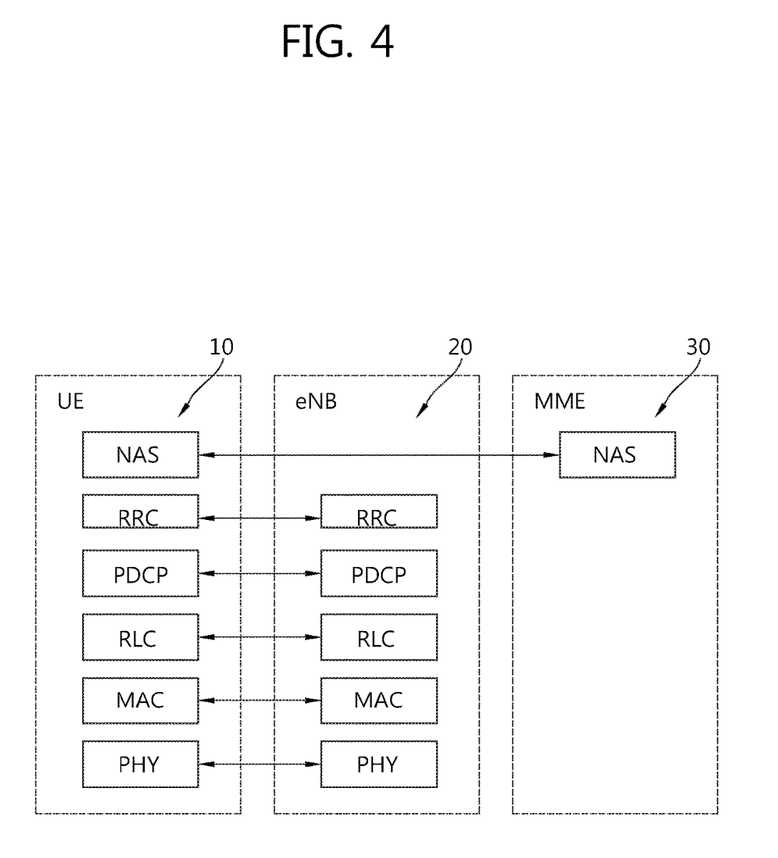
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e. between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
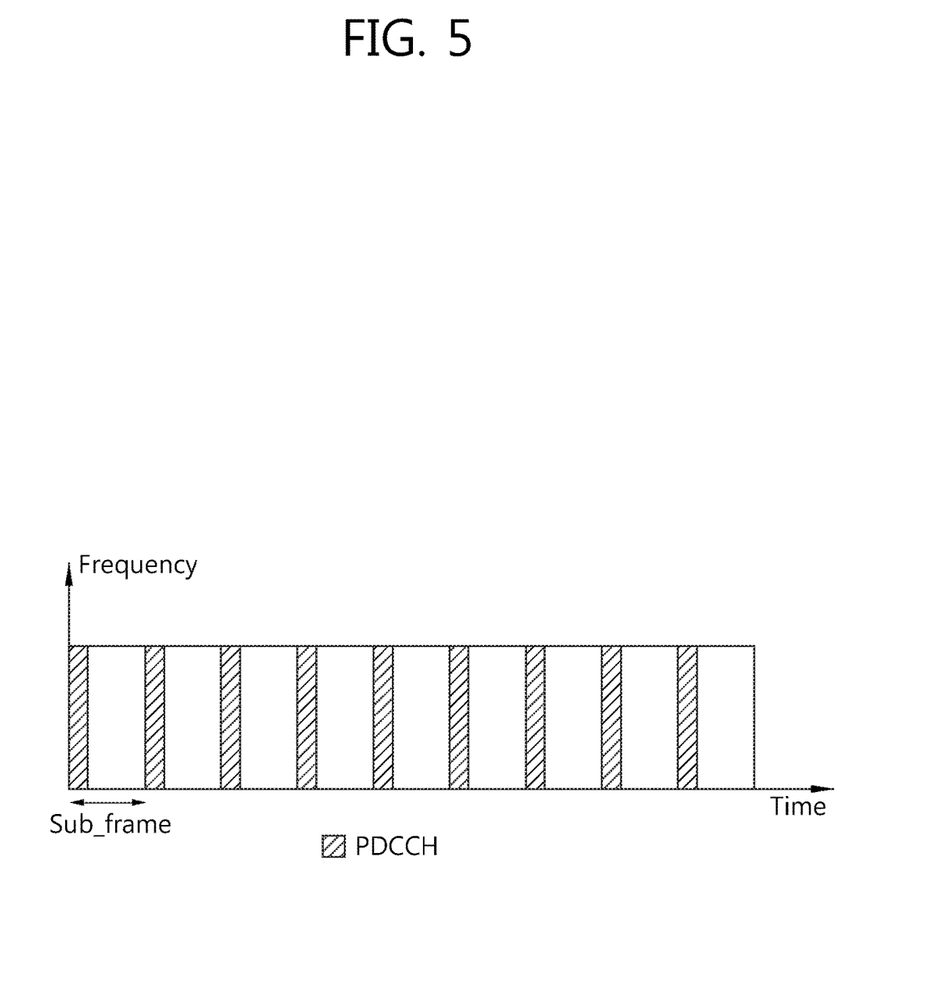
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Proximity-based services (ProSe) are described. It may be referred to 3GPP TR 23.703 V1.0.0 (2013-12). ProSe may be a concept including a device-to-device (D2D) communication. Hereinafter, "ProSe" may be used by being mixed with "D2D".

ProSe direct communication means a communication between two or more UEs in proximity that are ProSe-enabled, by means of user plane transmission using E-UTRA technology via a path not traversing any network node. ProSe-enabled UE means a UE that supports ProSe requirements and associated procedures. Unless explicitly stated otherwise, a ProSe-enabled UE refers both to a non-public safety UE and a public safety UE. ProSe-enabled public safety UE means a ProSe-enabled UE that also supports ProSe procedures and capabilities specific to public safety. ProSe-enabled non-public safety UE means a UE that supports ProSe procedures and but not capabilities specific to public safety. ProSe direct discovery means a procedure employed by a ProSe-enabled UE to discover other ProSe-enabled UEs in its vicinity by using only the capabilities of the two UEs with 3GPP LTE rel-12 technology. EPC-level ProSe discovery means a process by which the EPC determines the proximity of two ProSe-enabled UEs and informs them of their proximity. ProSe UE identity (ID) is a unique identity allocated by evolved packet system (EPS) which identifies the ProSe enabled UE. ProSe application ID is an identity identifying application related information for the ProSe enabled UE.

Figure 6:
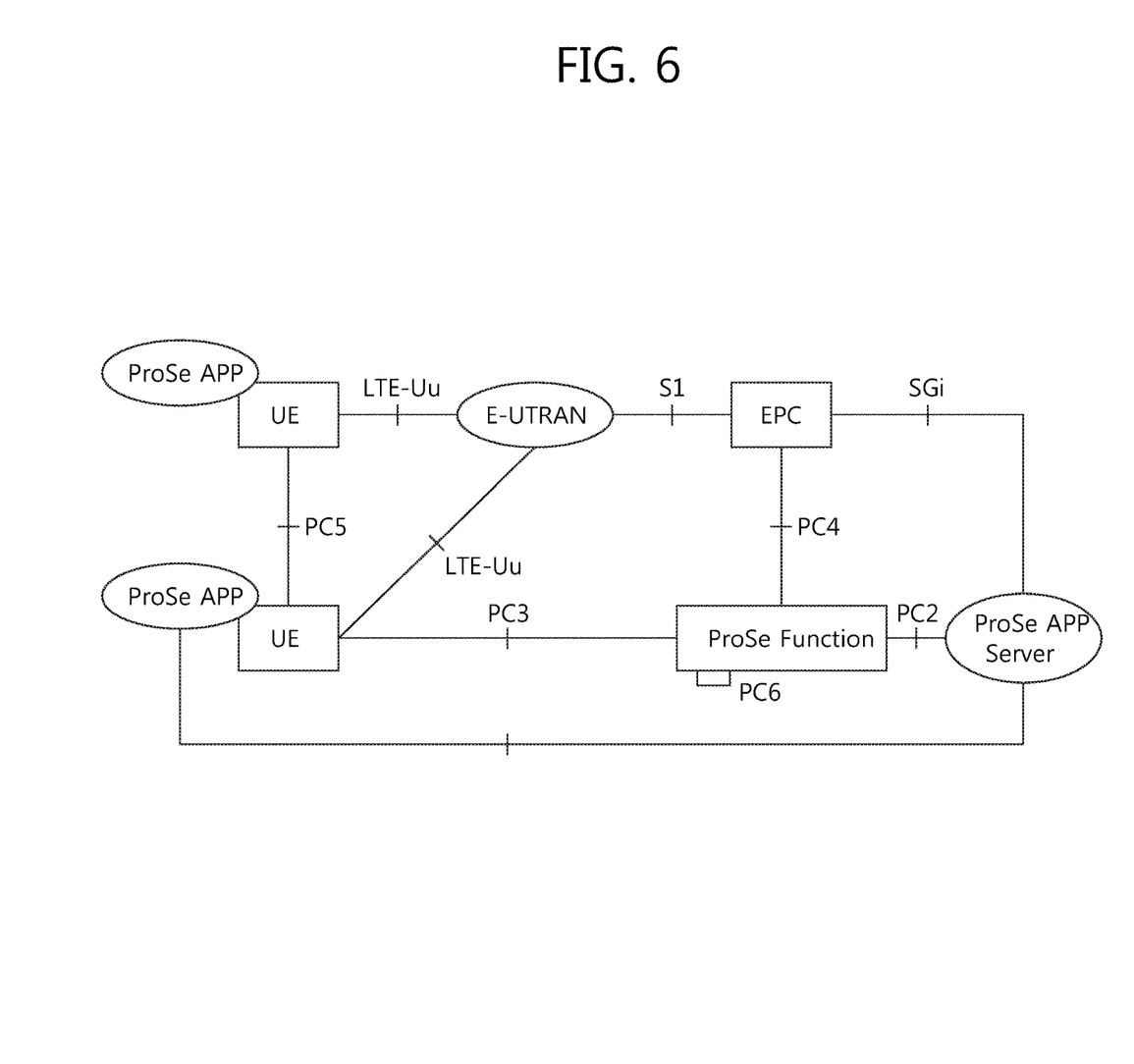
FIG. 6 shows reference architecture for ProSe.

FIG. 6 shows reference architecture for ProSe. Referring to FIG. 6, the reference architecture for ProSe includes E-UTRAN, EPC, a plurality of UEs having ProSe applications, ProSe application server, and ProSe function. The EPC represents the E-UTRAN core network architecture. The EPC includes entities such as MME, S-GW, P-GW, policy and charging rules function (PCRF), home subscriber server (HSS), etc. The ProSe application servers are users of the ProSe capability for building the application functionality. In the public safety cases, they can be specific agencies (PSAP), or in the commercial cases social media. These applications rare defined outside the 3GPP architecture but there may be reference points towards 3GPP entities. The application server can communicate towards an application in the UE. Applications in the UE use the ProSe capability for building the application functionality. Example may be for communication between members of public safety groups or for social media application that requests to find buddies in proximity.

The ProSe function in the network (as part of EPS) defined by 3GPP has a reference point towards the ProSe application server, towards the EPC and the UE. The functionality may include at least one of followings, but not be restricted thereto.

Interworking via a reference point towards the 3rd party applications

Authorization and configuration of the UE for discovery and direct communication Enable the functionality of the EPC level ProSe discovery ProSe related new subscriber data and handling of data storage, and also handling of ProSe identities Security related functionality Provide control towards the EPC for policy related functionality Provide functionality for charging (via or outside of EPC, e.g., offline charging)

Reference points/interfaces in the reference architecture for ProSe are described.

PC1: It is the reference point between the ProSe application in the UE and in the ProSe application server. It is used to define application level signaling requirements.

PC2: It is the reference point between the ProSe application server and the ProSe function. It is used to define the interaction between ProSe application server and ProSe functionality provided by the 3GPP EPS via ProSe function. One example may be for application data updates for a ProSe database in the ProSe function. Another example may be data for use by ProSe application server in interworking between 3GPP functionality and application data, e.g., name translation.

PC3: It is the reference point between the UE and ProSe function. It is used to define the interaction between UE and ProSe function. An example may be to use for configuration for ProSe discovery and communication.

PC4: It is the reference point between the EPC and ProSe function. It is used to define the interaction between EPC and ProSe function. Possible use cases may be when setting up a one-to-one communication path between UEs or when validating ProSe services (authorization) for session management or mobility management in real time.

PC5: It is the reference point between UE to UE used for control and user plane for discovery and communication, for relay and one-to-one communication (between UEs directly and between UEs over LTE-Uu).

PC6: This reference point may be used for functions such as ProSe discovery between users subscribed to different PLMNs.

SGi: In addition to the relevant functions via SGi, it may be used for application data and application level control information exchange.

Sidelink is UE to UE interface for ProSe direct communication and ProSe direct discovery. Sidelink comprises ProSe direct discovery and ProSe direct communication between UEs. Sidelink uses uplink resources and physical channel structure similar to uplink transmissions. Sidelink transmission uses the same basic transmission scheme as the UL transmission scheme. However, sidelink is limited to single cluster transmissions for all the sidelink physical channels. Further, sidelink uses a 1 symbol gap at the end of each sidelink sub-frame.

Figure 7:
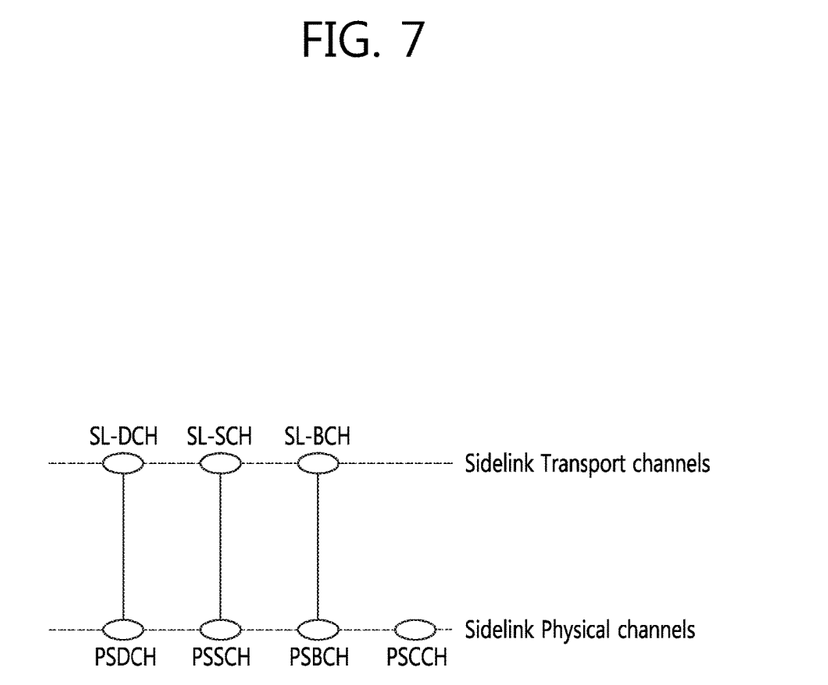
FIG. 7 shows an example of mapping between sidelink transport channels and sidelink physical channels.

FIG. 7 shows an example of mapping between sidelink transport channels and sidelink physical channels. Referring to FIG. 7, a physical sidelink discovery channel (PSDCH), which carries ProSe direct discovery message from the UE, may be mapped to a sidelink discovery channel (SL-DCH). The SL-DCH is characterized by:

fixed size, pre-defined format periodic broadcast transmission;

support for both UE autonomous resource selection and scheduled resource allocation by eNB;

collision risk due to support of UE autonomous resource selection; no collision when UE is allocated dedicated resources by the eNB.

A physical sidelink shared channel (PSSCH), which carries data from a UE for ProSe direct communication, may be mapped to a sidelink shared channel (SL-SCH). The SL-SCH is characterized by:

support for broadcast transmission;

support for both UE autonomous resource selection and scheduled resource allocation by eNB;

collision risk due to support of UE autonomous resource selection; no collision when UE is allocated dedicated resources by the eNB;

support for HARQ combining, but no support for HARQ feedback;

support for dynamic link adaptation by varying the transmit power, modulation and coding.

A physical sidelink broadcast channel (PSBCH), which carries system and synchronization related information transmitted from the UE, may be mapped to a sidelink broadcast channel (SL-BCH). The SL-BCH is characterized by pre-defined transport format. A physical sidelink control channel (PSCCH) carries control from a UE for ProSe direct communication.

Figure 8:
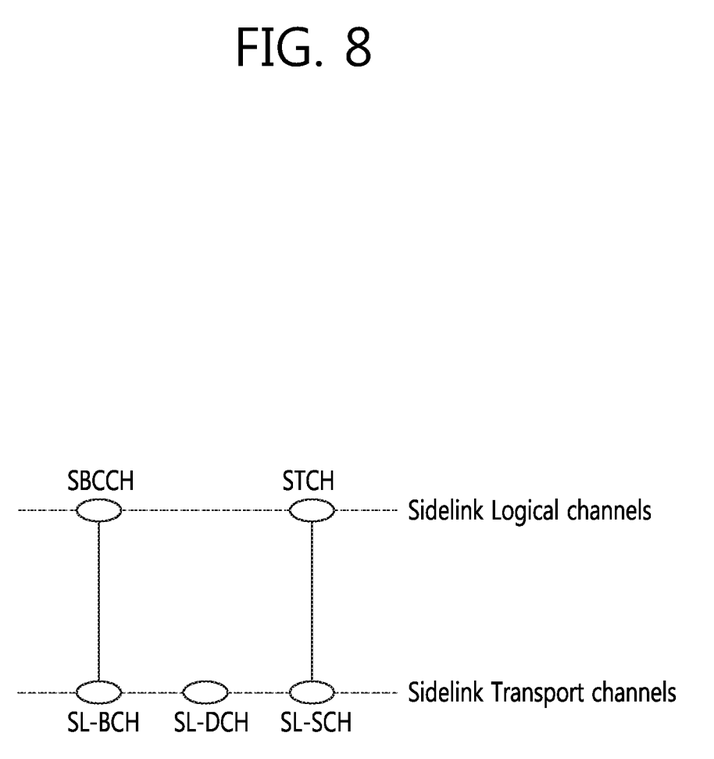
FIG. 8 shows an example of mapping between sidelink logical channels and sidelink transport channels for ProSe direct communication.

FIG. 8 shows an example of mapping between sidelink logical channels and sidelink transport channels for ProSe direct communication. Referring to FIG. 8, the SL-BCH may be mapped to a sidelink broadcast control channel (SBCCH), which is a sidelink channel for broadcasting sidelink system information from one UE to other UE(s). This channel is used only by ProSe direct communication capable UEs. The SL-SCH may be mapped to a sidelink traffic channel (STCH), which is a point-to-multipoint channel, for transfer of user information from one UE to other UEs. This channel is used only by ProSe direct communication capable UEs.

ProSe direct communication is a mode of communication whereby UEs can communicate with each other directly over the PC5 interface. This communication mode is supported when the UE is served by E-UTRAN and when the UE is outside of E-UTRA coverage. Only those UEs authorized to be used for public safety operation can perform ProSe direct communication. The UE performs Prose direct communication on subframes defined over the duration of sidelink control period. The sidelink control period is the period over which resources allocated in a cell for sidelink control and sidelink data transmissions occur. Within the sidelink control period the UE sends a sidelink control followed by data. Sidelink control indicates a layer 1 ID and characteristics of the transmissions (e.g. MCS, location of the resource(s) over the duration of sidelink control period, timing alignment).

ProSe direct discovery is defined as the procedure used by the UE supporting direct discovery to discover other UE(s) in its proximity, using E-UTRA direct radio signals via PC5. ProSe direct discovery is supported only when the UE is served by E-UTRAN.

D2D operation may include D2D transmission and D2D reception. According to scheduling, D2D transmission and D2D reception may coincide at the same subframe. However, the UE may not perform D2D transmission and D2D reception at the same subframe simultaneously.

In order to solve the problem described above, a method for prioritizing D2D transmission and D2D reception according to an embodiment of the present invention is described. According to an embodiment of the present invention, when the UE cannot perform D2D transmission and D2D reception at the same subframe simultaneously, one of D2D transmission or D2D reception is prioritized. Therefore, overlapping of D2D transmission and D2D reception can be avoided.

Figure 9:
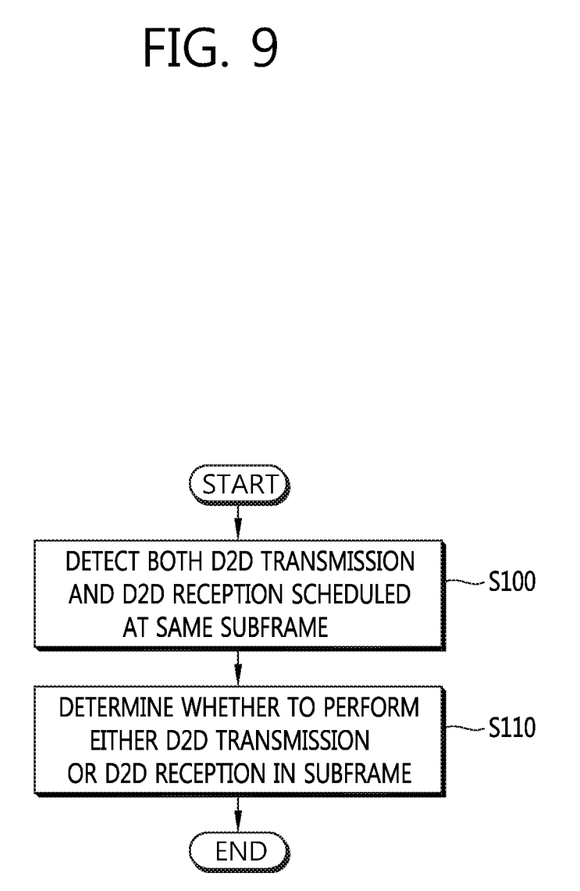
FIG. 9 shows an example of a method for prioritizing D2D transmission and D2D reception according to an embodiment of the present invention.

FIG. 9 shows an example of a method for prioritizing D2D transmission and D2D reception according to an embodiment of the present invention. In the description below, the D2D transmission/reception may correspond to D2D communication and/or D2D discovery. The UE may configure D2D logical channels for the D2D transmission and D2D logical channels for the D2D reception simultaneously. The UE may configure a logical channel priority for each configured logical channel, e.g. via pre-configuration or via configuration received from the network. The UE may receive scheduling assignment indicating the D2D reception with a priority of the D2D reception or a priority of D2D logical channel for the D2D reception. The UE may receive scheduling assignment indicating the D2D transmission with a priority of the D2D transmission or a priority of D2D logical channel for the D2D transmission.

In step S100, the UE, incapable of performing D2D transmission and D2D reception simultaneously, detects both the D2D transmission and the D2D reception, which are scheduled at the same subframe, over the direct interface among UEs. In step S110, the UE determines whether to perform either the D2D transmission or the D2D reception at the same subframe.

The UE may prioritize the D2D reception over the D2D transmission, if the D2D transmission scheduled at the subframe corresponds to a low priority of a D2D logical channel or a low priority of D2D service. The UE may prioritize the D2D reception over the D2D transmission, if the D2D transmission corresponds to a lower priority of D2D logical channel or a lower priority of D2D service in transmission than the priority of D2D logical channel/D2D service in reception. The UE may prioritize the D2D reception over the D2D transmission, if the D2D reception scheduled at the subframe corresponds to a high priority of a D2D logical channel or a high priority of D2D service. The UE may prioritize the D2D reception over the D2D transmission, if the D2D reception corresponds to a higher priority of D2D logical channel or a higher priority of D2D service in reception than the priority of D2D logical channel/D2D service in transmission.

Alternatively, the UE may prioritize the D2D transmission over the D2D reception, if the D2D reception scheduled at the subframe corresponds to a low priority of a D2D logical channel or a low priority of D2D service. The UE may prioritize the D2D transmission over the D2D reception, if the D2D reception corresponds to a lower priority of D2D logical channel or a lower priority of D2D service in reception than the priority of D2D logical channel/D2D service in transmission. The UE may prioritize the D2D transmission over the D2D reception, if the D2D transmission scheduled at the subframe corresponds to a high priority of a D2D logical channel or a high priority of D2D service. The UE may prioritize the D2D transmission over the D2D reception, if the D2D transmission corresponds to a higher priority of D2D logical channel or a higher priority of D2D service in transmission than the priority of D2D logical channel/D2D service in reception.

Alternatively, the D2D transmission may be always prioritized over the D2D reception, or the D2D reception may be always prioritized over the D2D transmission.

Specifically, the public safety specific D2D service and/or a D2D logical channel for the public safety specific D2D service may be considered as the high priority, if there is no pre-configuration or no network configuration. Further, the vehicle-to-everything (V2X) transmission specific D2D service and/or a D2D logical channel for the V2X transmission specific D2D service may be considered as the high priority, if there is no pre-configuration or no network configuration. The V2X transmission may further include, e.g. vehicle-to-vehicle (V2V), vehicle-to-pedestrians (V2P), or vehicle-to-infrastructure (V2I) transmission. The other D2D services and/or D2D logical channels for the other D2D services may be considered as the low priority.

The UE may perform the D2D transmission at the same subframe over the direct interface if the D2D transmission is prioritized over the D2D reception. If the D2D reception is de-prioritized for the same subframe, the UE may schedule the D2D reception in the next scheduling opportunity. Alternatively, the UE may perform the D2D reception at the same subframe over the direct interface if the D2D reception is prioritized over the D2D transmission. If the D2D transmission is de-prioritized for the same subframe, the UE may schedule the D2D transmission in the next scheduling opportunity.

If the receiving UE receives the scheduling assignment of the D2D transmission for the subframe, but the UE detects no D2D transmission (corresponding to the receiving UE) in the subframe (e.g. if it detects another D2D transmission with different D2D ID/address in MAC protocol data unit (PDU) or cyclic redundancy check (CRC) failure), it may consider that the D2D transmission occurs in the next scheduling opportunity and so receive the D2D transmission in the next scheduling opportunity, regardless of the scheduling assignment.

For another embodiment of the present invention, the present invention may be applied to scheduling of D2D transmission/reception and uplink transmission to the eNB in collision. The UE may configure D2D logical channels for the D2D transmission and D2D logical channels for the D2D reception simultaneously. The UE may configure a logical channel priority for each configured logical channel, e.g. via pre-configuration or via configuration received from the network. The UE may compare a priority of D2D logical channel. The UE may receive the scheduling assignment indicating the D2D reception with a priority of the D2D reception or a priority of D2D logical channel for the D2D reception. The UE may receive the scheduling assignment indicating the D2D transmission with a priority of the D2D reception or a priority of D2D logical channel for the D2D transmission.

If the D2D transmission/reception is scheduled at the same subframe with uplink transmission on Uu, and if the UE is not capable of performing D2D transmission/reception and uplink transmission at the same subframe simultaneously, the UE determines whether to perform D2D transmission/reception or uplink transmission at the same subframe. The UE may prioritize the uplink transmission over the D2D transmission/reception, if the D2D transmission/reception scheduled at the subframe corresponds to a low priority of a D2D logical channel or a low priority of D2D service. The UE may prioritize the uplink transmission over the D2D transmission/reception, if the uplink transmission scheduled at the subframe corresponds to a high priority of a logical channel or a high priority of service.

Alternatively, the UE may prioritize the D2D transmission/reception over the uplink transmission, if the uplink transmission scheduled at the subframe corresponds to a low priority of a logical channel or a low priority of service. The UE may prioritize the D2D transmission/reception over the uplink transmission, if the D2D transmission/reception scheduled at the subframe corresponds to a high priority of a D2D logical channel or a high priority of D2D service. The public safety specific D2D service and/or a D2D logical channel for the public safety specific D2D service may be considered as the high priority, if there is no pre-configuration or no network configuration. Further, the V2X transmission specific D2D service and/or a D2D logical channel for the V2X transmission specific D2D service may be considered as the high priority, if there is no pre-configuration or no network configuration. The V2X transmission may further include, e.g. V2V, V2P, or V2I transmission. The other D2D services and/or D2D logical channels for the other D2D services may be considered as the low priority.

Alternatively, the D2D transmission/reception may be always prioritized over the uplink transmission, or the uplink transmission may be always prioritized over the D2D transmission/reception.

The UE may perform the D2D transmission/reception at the same subframe over the direct interface if the D2D transmission/reception is prioritized over the uplink transmission. If the uplink transmission is de-prioritized for the same subframe, the UE may schedule the uplink transmission in the next scheduling opportunity. Alternatively, the UE may perform the uplink transmission at the same subframe over the Uu if the uplink transmission is prioritized over the D2D transmission/reception. If the D2D transmission/reception is de-prioritized for the same subframe, the UE may schedule the D2D transmission/reception in the next scheduling opportunity.

If the receiving UE receives the scheduling assignment of the D2D transmission/reception for the subframe, but the UE detects no D2D transmission/reception (corresponding to the receiving UE) in the subframe (e.g. if it detects another D2D transmission with different D2D ID/address in MAC protocol data unit (PDU) or cyclic redundancy check (CRC) failure), it may consider that the D2D transmission/reception occurs in the next scheduling opportunity and so perform the D2D transmission/reception in the next scheduling opportunity, regardless of the scheduling assignment.

Figure 10:
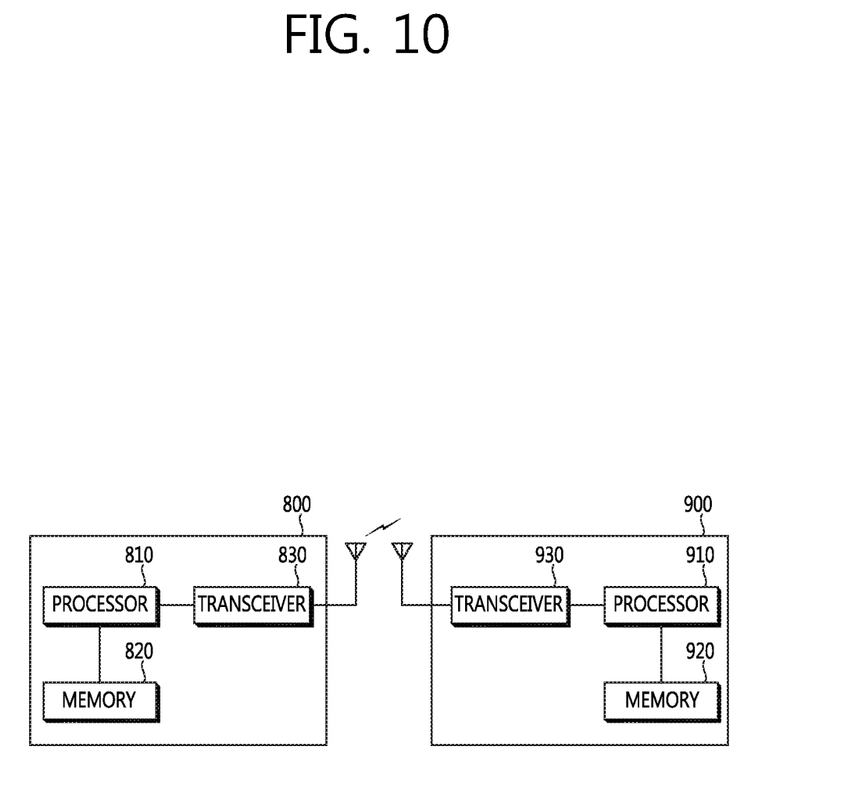
FIG. 10 shows a wireless communication system to implement an embodiment of the present invention.

FIG. 10 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for prioritizing device-to-device (D2D) transmission and D2D reception in a wireless communication system, the method performed by a user equipment (UE) and comprising:
   detecting whether both the D2D transmission and the D2D reception are scheduled at the same subframe;
   determining whether both the D2D transmission and the D2D reception are possible at the same subframe simultaneously when both the D2D transmission and the D2D reception are scheduled at the same subframe;
   determining whether priority information is present or not when the both the D2D transmission and the D2D reception are not possible at the same subframe simultaneously;
   prioritizing for the D2D transmission and the D2D reception based on whether priority information is present or not; and
   performing the D2D transmission or the D2D reception at the same subframe based on the prioritization,
   wherein if the priority information is present, the UE performs the D2D transmission or the D2D reception according to the priority information, and if the priority information is not present and the D2D transmission is vehicle-to-everything (V2X) transmission, the V2X transmission is prioritized over other D2D operations including the D2D reception and the UE performs the V2X transmission.

2. The method of claim 1, wherein the D2D reception corresponds to a low priority of a D2D logical channel or a D2D service.

3. The method of claim 1, wherein the V2X transmission includes at least one of a vehicle-to-vehicle (V2V) transmission, a vehicle-to-pedestrians (V2P) transmission, or a vehicle-to-infrastructure (V2I) transmission.

4. The method of claim 1, wherein the V2X transmission is performed at the same subframe when it is determined to perform the D2D transmission.

5. The method of claim 4, wherein the D2D reception is scheduled in a next scheduling opportunity.

6. The method of claim 1, further comprising receiving a scheduling assignment indicating the priority information of at least one of the D2D transmission or the D2D reception from a network.

7. The method of claim 1, wherein the priority information of at least one of the D2D transmission or the D2D reception is preconfigured.

8. A user equipment (UE) comprising:
   a memory;
   a transceiver; and
   a processor coupled to the memory and the transceiver, and configured to:
      detect whether both D2D transmission and D2D reception are scheduled at the same subframe;
      determine whether both the D2D transmission and the D2D reception are possible at the same subframe simultaneously when both the D2D transmission and the D2D reception are scheduled at the same subframe;
      determine whether priority information is present or not when the both the D2D transmission and the D2D reception are not possible at the same subframe simultaneously;
      prioritize for the D2D transmission and the D2D reception based on whether priority information is present or not; and
      control to perform the D2D transmission or the D2D reception at the same subframe based on the prioritization,
      wherein if the priority information is present, the UE performs the D2D transmission or the D2D reception according to the priority information, and if the priority information is not present and the D2D transmission is vehicle-to-everything (V2X) transmission, the V2X transmission is prioritized over other D2D operations including the D2D reception and the UE performs the V2X transmission.

9. The UE of claim 8, wherein the D2D reception corresponds to a low priority of a D2D logical channel or a D2D service.

10. The UE of claim 8, wherein the V2X transmission includes at least one of a vehicle-to-vehicle (V2V) transmission, a vehicle-to-pedestrians (V2P) transmission, or a vehicle-to-infrastructure (V2I) transmission.

11. The UE of claim 8, wherein the V2X transmission is performed at the same subframe when it is determined to perform the D2D transmission.

12. The UE of claim 11, wherein the D2D reception is scheduled in a next scheduling opportunity.

13. The UE of claim 8, wherein the processor is configured to receive a scheduling assignment indicating the priority information of at least one of the D2D transmission or the D2D reception from a network.

14. The UE of claim 8, wherein the priority information of at least one of the D2D transmission or the D2D reception is preconfigured.

* * * * *